US006431000B1

(12) United States Patent
Ostendorf et al.

(10) Patent No.: US 6,431,000 B1
(45) Date of Patent: Aug. 13, 2002

(54) METHOD AND APPARATUS FOR HIGH CYCLE FATIGUE LIFE TEST

(75) Inventors: Arthur Devol Ostendorf; Joseph Henry Hopster, both of Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/576,286

(22) Filed: May 23, 2000

(51) Int. Cl.$^7$ .................. G01N 29/00; G01R 27/26
(52) U.S. Cl. ............... 73/578; 73/660; 73/664; 324/662
(58) Field of Search .................. 73/578, 660, 663, 73/664, 662; 324/662

(56) References Cited

U.S. PATENT DOCUMENTS

| | | | | |
|---|---|---|---|---|
| 3,924,456 A | * | 12/1975 | Vahaviolos | 73/88.5 R |
| 3,983,745 A | * | 10/1976 | Juusola | 73/88 R |
| 4,118,147 A | | 10/1978 | Ellis | 416/230 |
| 4,240,047 A | * | 12/1980 | Rabinowitz et al. | 331/154 |
| 4,283,956 A | * | 8/1981 | Lechner et al. | 73/799 |
| 4,858,473 A | * | 8/1989 | Latour, Jr. et al. | 73/805 |
| 4,955,269 A | * | 9/1990 | Kendig et al. | 73/577 |
| 5,049,878 A | * | 9/1991 | Stern | 340/870.4 |
| 5,125,265 A | * | 6/1992 | O'Connell et al. | 73/61.41 |
| 5,469,117 A | * | 11/1995 | Philippe | 331/109 |
| 5,505,794 A | | 4/1996 | Nakayama et al. | 148/508 |
| 5,952,890 A | * | 9/1999 | Fallisgaard et al. | 331/18 |
| 6,023,980 A | | 2/2000 | Owen et al. | 73/797 |
| 6,025,787 A | * | 2/2000 | Poduje et al. | 340/870.04 |
| 6,094,105 A | * | 7/2000 | Williamson | 331/116 |
| 6,095,755 A | | 8/2000 | Houston | 416/241 R |
| 6,098,022 A | * | 8/2000 | Sonnichsen et al. | 73/460 |
| 6,194,973 B1 | * | 2/2001 | Williamson | 331/109 |
| 6,274,193 B1 | | 8/2001 | Rigney et al. | 427/142 |

* cited by examiner

*Primary Examiner*—Hezron Williams
*Assistant Examiner*—Jacques Saint-Surin
(74) *Attorney, Agent, or Firm*—Nathan D. Herkamp; Armstrong Teasdale LLP

(57) ABSTRACT

A capacitance probe measures and tracks frequency and amplitude changes of a component during a high cycle fatigue portion of a life test. The probe includes an internal oscillator, an adjustable receiver circuit, a product detector, and a pair of gain amplifiers. The oscillator generates a single controlled frequency output. The receiver circuit receives the frequency and creates a DC voltage shift that nulls the capacitance bridge. The product detector detects an amplitude modulated product of the oscillator and rejects undesirable frequencies. The gain amplifiers detect a DC voltage shift and permit the capacitance effect to be easily nulled.

19 Claims, 2 Drawing Sheets

METHOD AND APPARATUS FOR HIGH CYCLE FATIGUE LIFE TEST

BACKGROUND OF THE INVENTION

This invention relates generally to life testing and, more particularly, to apparatus and methods for measuring frequency and displacement for a high cycle fatigue closed loop control.

Life testing is typically utilized in connection with components used in applications that are subjected to wide temperature ranges and vibration amplitudes. A high cycle fatigue (HCF) portion of the life test uses a closed loop control to measure frequency and displacement of the components. The component being tested is installed on a test stand and. shaken with an oscillator in an open loop mode. A capacitance probe is positioned next to the stand and measures a frequency and vibration amplitude of the component as it is shaken. Specifically, the capacitance probe measures the separation between the probe and a target material by determining an existing capacitance through a relationship between a charge and a potential difference between the two surfaces.

During the testing, as the component fatigues, a natural resonant frequency and amplitude of the component changes and the capacitance probe generates a signal representative of such changes. The signal generated by the capacitance probe is provided to the shaker closed loop control, and the shaker closed loop control operates to maintain the component vibration amplitude to a pre-set amplitude as the component fatigues.

Known capacitance probes include an internal oscillator and a receiver circuit. Because different components are tested, often the internal oscillator is a free-running multivibrator circuit capable of transmitting various frequencies. However, because the oscillator is a free-running circuit, the frequency transmitted by the oscillator may drift during testing depending on a proximity of the capacitance probe to the component being tested. In addition, due to the sensitivity of the receiver circuit, undesirable noise and other signals transmitted by the oscillator or generated during testing are received by the receiver circuit and may adversely impact the testing.

Furthermore, because the frequency drifts depending on the proximity of the capacitance probe to the component, DC voltage shifts occur depending on the proximity of the capacitance probe to the component. Such voltage shifts limit a dynamic range of output voltage of the capacitance probe and a wide band width and sensitivity of the receiver may permit electrical noise to dominate the frequencies being received.

BRIEF SUMMARY OF THE INVENTION

In an exemplary embodiment, a testing method permits frequency and displacement for a high cycle fatigue life test of a component to be accurately measured. More specifically, and in one embodiment, a capacitance probe accurately detects, measures and tracks the-frequency and amplitude changes of the component during the testing in a closed loop control. The probe includes an internal oscillator, a receiver circuit, a product detector, and a pair of gain amplifiers. The oscillator generates a single controlled frequency output received by the adjustable receiver circuit. The receiver circuit includes a capacitance bridge and is also adjustable to create a DC voltage shift that effectively nulls the capacitance bridge. The product detector detects an amplitude modulated product of the oscillator and the receiver circuit, and rejects undesirable frequencies before relaying a signal from the product detector. The gain amplifiers detect a DC voltage shift and permit the capacitance effect to be easily nulled. The gain amplifiers are also adjustable to prevent over-driving or over-amplifying of the output of the capacitance probe.

During a high cycle fatigue portion of a life test of the component, the capacitance probe is placed adjacent the component and is used to detect and track the frequency and amplitude changes of the component. During the test, as the component fatigues and the natural resonant frequency decreases, the capacitance probe transmits the changes in amplitude to the shaker closed loop control. Electric noise generated during the testing is eliminated with the use of the product detector and the gain amplifiers are adjusted to null the capacitance effect and permit a dynamic range of the output signal to be increased and centered such that the capacitance probe closed loop is stable. As a result, the capacitance probe provides accurate measurements of the frequency and displacement of a component during high cycle fatigue testing in a more accurate and cost-effective manner in comparison to known capacitance probes.

DETAILED DESCRIPTION OF THE INVENTION

Figure 1:
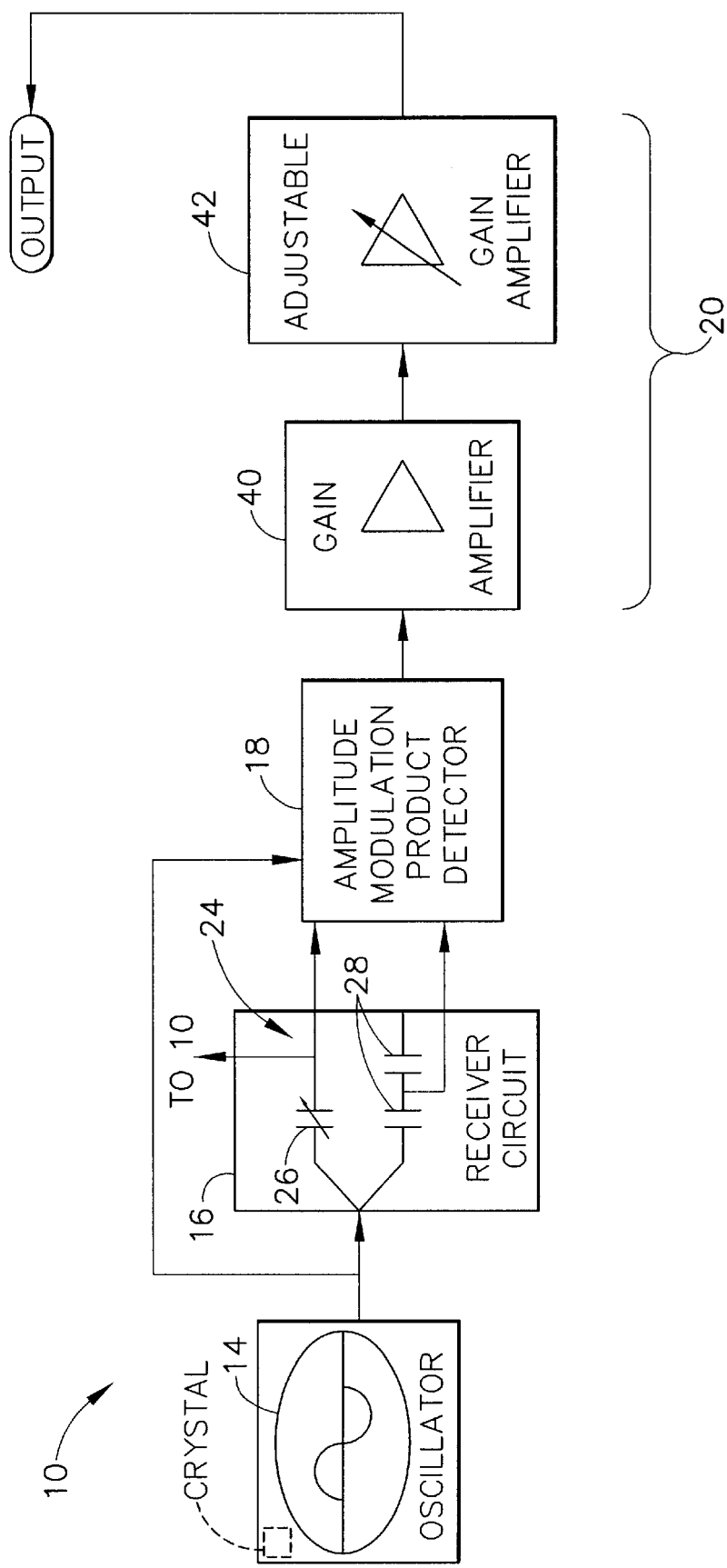
FIG. 1 is a block diagram of a capacitance probe.

FIG. 1 is block diagram of a capacitance probe 10 used to measure frequency and displacement for a high cycle fatigue life test of a component (not shown). In one embodiment, capacitance probe 10 measures frequency and displacement for a high cycle fatigue life test of a gas turbine engine blade (not shown). Capacitance probe 10 operates in a closed loop control and includes a printed circuit board (not shown) including an oscillator 14, a receiver circuit 16, a product detector 18, and a plurality of gain amplifiers 20. In one embodiment, the printed circuit board includes a ground plain (not shown) to minimize inducted noise into the circuit board.

Oscillator 14 includes a crystal (not shown) that generates a single controlled frequency output that is constant. Accordingly, because oscillator 14 is not a free-running multivibrator circuit, the frequency output from oscillator 14 does not drift as capacitance probe 10 is moved physically closer or farther from the component being fatigue tested. In one embodiment, oscillator 14 is a 5 MHz HS-100P oscillator available from Vishay Intertechnology, Inc., Malvern, Pa.

Receiver circuit 16 includes a tuned capacitance bridge or a wheatstone bridge 24 including at least one adjustable capacitor 26. Capacitance probe 10 functions as a fourth capacitor for wheatstone bridge 26. Adjustable capacitor 26 also permits a capacitance effect to be adjusted and balanced to cause a DC voltage shift that effectively nulls capacitance bridge 24. In an exemplary embodiment, tuned capacitance bridge 24 also includes two 30 pf capacitors 28 and adjustable capacitor 26 is a 5–25 pf adjustable capacitor available from Johanson Manufacturing Corporation, Boonton, N.J.

Product detector 18 receives an output from receiver circuit 16 and detects an amplitude modulated product of oscillator 14. Product detector 18 also rejects undesirable frequencies before relaying a signal from product detector 18. In one embodiment, product detector 18 is an MC1496 balanced modulator/demodulator available from Motorola, Inc., Austin, Tex.

Two gain amplifiers 20 are mounted to the circuit board. A first gain amplifier 40 is a 50:1 gain amplifier and receives an output from product detector 18. First gain amplifier 40 includes two light emitting devices, LEDs, (not shown) used to visually indicate a detected DC voltage shift from the output of first gain amplifier 40. When the LEDs are energized and lit, an operator may adjust capacitance bridge 24 to null the capacitance and when effectively adjusted, both LEDs are de-energize and are not illuminated. After the capacitance effect is nulled, the output of the capacitance probe may be placed next to the test component without any DC voltage shifts occurring.

A second gain amplifier 42 is a 200:1 gain amplifier and receives an output from first gain amplifier 40. Second gain amplifier 42 is a coupled gain amplifier and is adjustable to prevent over-driving or over-amplifying the output of the capacitance probe. In one embodiment, first and second gain amplifiers 40 and 42, respectively, include LF356 amplifiers available from National Semiconductor, Santa Clara, Calif.

During the high cycle fatigue portion of a life test of a component, the component is installed in a shaker stand (hot shown) and an oscillator (not shown) is used to shake the component with a natural frequency in an open loop mode. Capacitance probe 10 is placed adjacent the component and tracks the frequency and amplitude changes of the component in a closed loop control mode. Probe 10 is secured to a stand (not shown) having a weighted bottom and is held in position with the stand during the life test. During the test as the component fatigues and the natural resonant frequency decreases, capacitance probe 10 transmits the changes in amplitude to the shaker oscillator. Electro-magnetic induction heating, EMI, noise generated of the component during the testing is eliminated with the use of product detector 18. Additionally, gain amplifiers 40 and 42 permit the capacitance effect to be adjusted to null while a dynamic range of the output signal is increased and centered. Centering the dynamic range of the output signal with gain amplifiers 40 and 42 ensures the capacitance probe closed loop is stable. As a result, probe 10 can be placed adjacent the test component and after capacitance bridge 24 is nulled, DC voltage shifts are reduced during the fatigue life test.

To fatigue test another component (not shown), the first component is removed from the shaker stand and the new component is installed. After the new test component is installed on the test stand, capacitance probe 10 is placed adjacent to the new component and moved slowly a distance from the component until reaching a point where the LEDs are de-energized. At such a point, known as a null point, capacitance probe 10 is the same distance from the new component during the current fatigue test as capacitance probe 10 was during the previous fatigue test of the first component. An amplitude of the output is dependant upon the distance of the probe from the component. Because the distances are the same during both tests and are easily repeatable, no recalibration or displacement adjustments are needed when testing numerous components, thus, ensuring that a characteristic amplitude of the dynamic range is the same from component test to component test.

Figure 2:
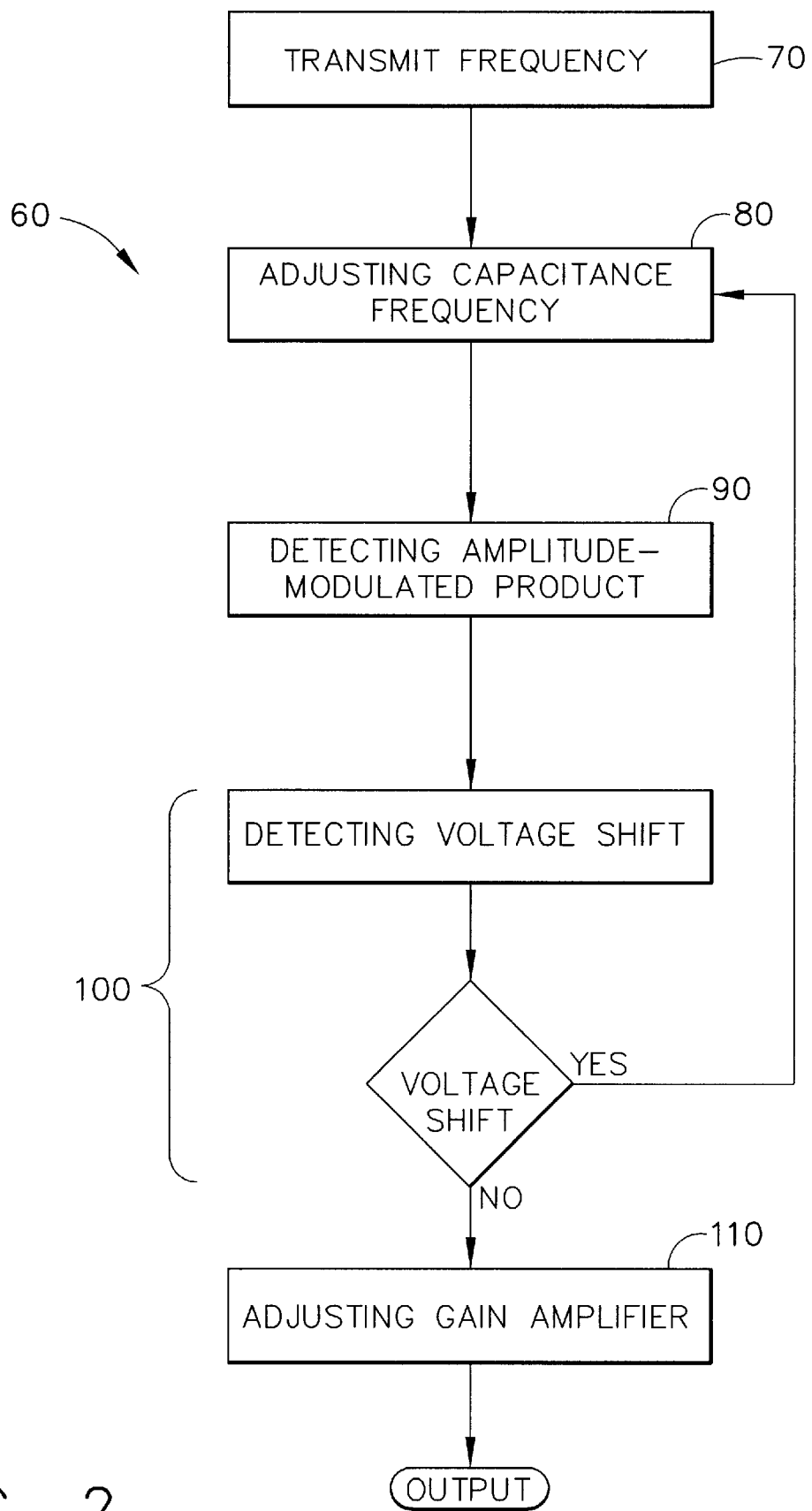
FIG. 2 is a flowchart of a method of measuring frequency and displacement for a high cycle fatigue area of a component using the capacitance probe shown in FIG. 1.

FIG. 2 is a flowchart of a method 60 used for measuring frequency and displacement for a high cycle fatigue portion of a component (not shown) using a capacitance probe (not shown in FIG. 2), such as capacitance probe 10 shown in FIG. 1. Initially, after the component is attached to a test stand, the capacitance probe transmits 70 a single frequency. In one embodiment, the capacitance probe includes an oscillator (not shown) that includes a crystal (not shown) that generates a controlled frequency output. In one embodiment, the oscillator is a 5 MHz clock.

A capacitance bridge (not shown) is adjusted 80 to receive the single frequency transmitted 70. Adjusting 80 the capacitance bridge to receive the frequency also adjusts the capacitance effect such that a DC voltage shift across a first stage amplifier (not shown) is nulled. In one embodiment, the capacitance bridge is adjusted 80 to receive changes in capacitance at a frequency of 5 MHz.

After the capacitance bridge is adjusted 80 to receive the single frequency transmitted 70, an amplitude-modulated product of the oscillator is detected 90 with a product detector (not shown in FIG. 2). The product detector also rejects 92 any undesirable frequencies before relaying a signal. In one embodiment, the product detector detects 90 only amplitude modulations of 5 MHz.

The product detector relays the signal to a first gain amplifier (not shown in FIG. 2) which detects 100 a DC voltage shift from the output of the first gain amplifier. In one embodiment, the first gain amplifier includes a pair of LED's that illuminate when a DC voltage shift is detected 100 across the first gain amplifier. If any DC voltage shift is detected 100 across the first gain amplifier, an operator may adjust 80 the capacitance bridge to null the capacitance effect prior to a signal being relayed from the product detector. Furthermore, adjusting 80 the capacitance bridge to null the capacitance effect also centers a dynamic range of output signal to stabilize the closed loop. As a result, the output of the capacitance probe can be placed adjacent the test component and after the bridge is adjusted 80 to null the capacitance effect, DC voltage shifts are reduced.

A last stage of method 60 includes a second gain amplifier (not shown in FIG. 2) that is adjusted 110 to prevent over-driving or over-amplifying an output of the capacitance probe. Because the amplitude of the output of the capacitance probe depends on a distance of the capacitance probe from the component, no recalibration is needed from component test to component test. As a result, the characteristic amplitude of the dynamic range remains constant as various components are tested and displacement adjustments to the capacitance probe are reduced.

The above-described method for measuring frequency and displacement for a high cycle fatigue portion of a component life test is cost-effective and highly reliable. The capacitance probe used to execute the method accurately measures the frequency and displacement of a component being tested. Furthermore, because the capacitance probe is adjustable to screen out undesirable noise, potentially damaging DC voltage shifts are reduced such that the capacitance probe may be placed adjacent the component to accurately measure the frequency and displacement of the component during high cycle fatigue testing.

While the invention has been described in terms of various specific embodiments, those skilled in the art will recognize that the invention can be practiced with modification within the spirit and scope of the claims.

What is claimed is:

1. A method for measuring frequency and displacement for a high cycle fatigue portion of a life test of a component using a capacitance probe including an oscillator, said method comprising the steps of:

transmitting a single frequency to the component with an oscillator that includes a crystal configured to generate a controlled frequency output;

detecting a frequency output from the component with a detector; and adjusting a capacitance bridge to receive the frequency output from the component.

2. A method in accordance with claim 1 wherein said step of adjusting a capacitor bridge further comprises the step of adjusting the capacitance effect to cause a DC voltage shift to effectively null the capacitance bridge.

3. A method in accordance with claim 2 further comprising the step of detecting an amplitude-modulated product of the oscillator.

4. A method in accordance with claim 3 further comprising the step of rejecting undesirable frequencies with a gain amplifier.

5. A method in accordance with claim 4 further comprising the step of preventing over-amplifying of the output.

6. A method in accordance with claim 5 wherein said step of preventing over amplifying of the output further comprises the step of using a coupled gain amplifier to prevent over-amplifying of the output.

7. Apparatus for measuring frequency and displacement for a high cycle fatigue portion of a life test of a component, said apparatus comprising:

an oscillator comprising a crystal configured to generate a single controlled frequency output directed to the component;

a product detector configured to detect an amplitude-modulated product of said oscillator; and a receiver circuit comprising a balanced capacitance bridge that is adjustable to receive a single frequency from the component.

8. Apparatus in accordance with claim 7 wherein said balanced capacitance bridge comprises at least one adjustable capacitor.

9. Apparatus in accordance with claim 8 wherein said adjustable capacitor configured to null said capacitance bridge.

10. Apparatus in accordance with claim 7 further comprising a gain amplifier configured to amplify desirable frequencies.

11. Apparatus in accordance with claim 7 wherein said gain amplifier is a 50:1 gain amplifier.

12. Apparatus in accordance with claim 7 further comprising a coupled gain amplifier configured to prevent over-amplifying an output of said apparatus.

13. Apparatus in accordance with claim 12 wherein said gain amplifier is a 200:1 AC coupled gain amplifier.

14. A capacitance probe in accordance with claim 13 wherein said second gain amplifier is a 200:1 AC coupled gain amplifier.

15. A capacitance probe for measuring frequency and displacement for a high cycle fatigue portion of a life test of a component, said probe comprising:

an oscillator comprising a crystal configured to generate a single controlled frequency output directed to the component; and a receiver circuit comprising a balanced capacitance bridge configured to receive a single frequency output from the component, said balanced capacitance bridge comprising at least one adjustable capacitor for determining the displacement of the component based on the measured frequency.

16. A capacitance probe in accordance with claim 15 further comprising a product detector configured to detect an amplitude-modulated product of said oscillator, said adjustable capacitor configured to null said capacitance bridge.

17. A capacitance probe in accordance with claim 16 further comprising a first gain amplifier configured to amplify desirable frequencies.

18. A capacitance probe in accordance with claim 16 wherein said first gain amplifier is a 50:1 gain amplifier.

19. A capacitance probe in accordance with claim 16 further comprising a second gain amplifier configured to prevent over-amplifying an output of said apparatus.

* * * * *